United States Patent
Borhanazad et al.

(10) Patent No.: US 11,663,843 B2
(45) Date of Patent: May 30, 2023

(54) AUTOMATIC SELECTION OF TEMPLATES FOR EXTRACTION OF DATA FROM ELECTRONIC DOCUMENTS

(71) Applicant: Coupa Software Incorporated, San Mateo, CA (US)

(72) Inventors: Hanieh Borhanazad, Sydney (AU); Jimmy Chandra, Sydney (AU); Jey Jeyaramanan, Sydney (AU); Thuwaragan Sundaramoorthy, Sydney (AU); Mark Burch, Sydney (AU)

(73) Assignee: Coupa Software Incorporated, San Mateo, CA (US)

( * ) Notice: Subject to any disclaimer, the term of this patent is extended or adjusted under 35 U.S.C. 154(b) by 349 days.

(21) Appl. No.: 16/953,784

(22) Filed: Nov. 20, 2020

(65) Prior Publication Data

US 2022/0027615 A1    Jan. 27, 2022

Related U.S. Application Data

(60) Provisional application No. 63/057,146, filed on Jul. 27, 2020.

(51) Int. Cl.
*G06V 30/418* (2022.01)
*G06F 40/186* (2020.01)
*G06V 30/412* (2022.01)

(52) U.S. Cl.
CPC .......... *G06V 30/418* (2022.01); *G06F 40/186* (2020.01); *G06V 30/412* (2022.01)

(58) Field of Classification Search
CPC ... G06V 30/418; G06V 30/412; G06F 40/186
(Continued)

(56) References Cited

U.S. PATENT DOCUMENTS 9,436,760 B1 * 9/2016 Tacchi ................ G06F 16/9024
10,108,697 B1 * 10/2018 Poteet ..................... G06F 16/38
(Continued)

OTHER PUBLICATIONS

Dhakal et al, One-Shot Template Matching for Automatic Document Data Capture, published Oct. 22, 2019 via arXiv, pp. 1-5 (pdf).*

(Continued)

*Primary Examiner* — Manglesh M Patel
(74) *Attorney, Agent, or Firm* — Baker Botts L.L.P.

(57) ABSTRACT

A computer-implemented method for automatic template selection for extracting data from an input electronic document is provided. The method includes receiving a first set of candidate templates and an input electronic document. For each candidate template, a template similarity ratio value is calculated that represents a similarity of the candidate template to the input electronic document. The first set of candidate templates are ranked according to the template similarity ratios and then matched to the input electronic document resulting in generating a normalized similarity score for each particular candidate from among the candidate templates. Differences in normalized similarity scores of successive pairs of the candidate templates is determined and a breaking point is established. A second set of candidate templates is formed by selecting candidate templates that are ranked above the breaking point. Data from the input electronic document is extracted using the second set of candidate templates.

18 Claims, 16 Drawing Sheets

(58) Field of Classification Search
USPC .......................................................... 382/218
See application file for complete search history.

(56) References Cited

U.S. PATENT DOCUMENTS

| | | | |
|---|---|---|---|
| 2009/0265160 A1* | 10/2009 | Williams | G06F 40/194 |
| | | | 382/218 |
| 2010/0254615 A1* | 10/2010 | Kantor | G06F 18/22 |
| | | | 382/218 |
| 2019/0303459 A1* | 10/2019 | Yan | G06F 16/35 |
| 2020/0311683 A1* | 10/2020 | Chua | G06F 40/30 |

OTHER PUBLICATIONS

Bostrom, et al., Automatic reading and interpretation of paper invoices, Independent Project in Information Engineering, 38 pages, May 2016.

Sable, Automating Invoice Processing with OCR and Deep Learning, Nanonets, Automate Data Capture, 17 pages, 2020.

* cited by examiner

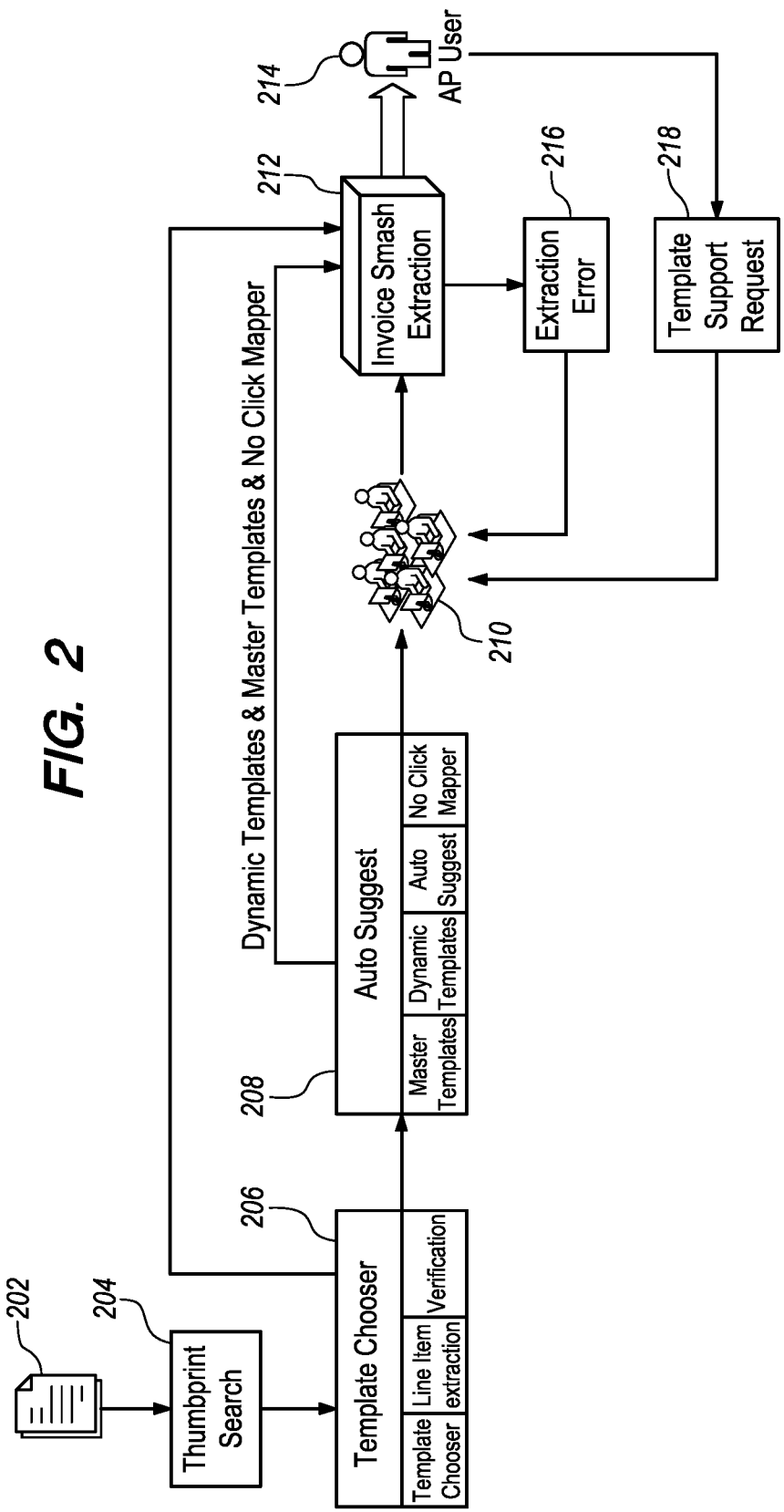

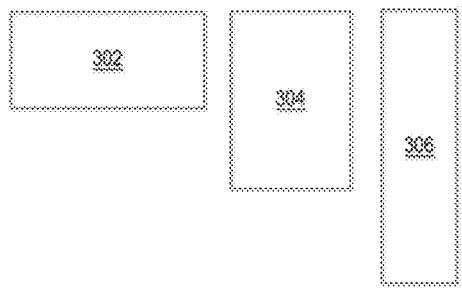 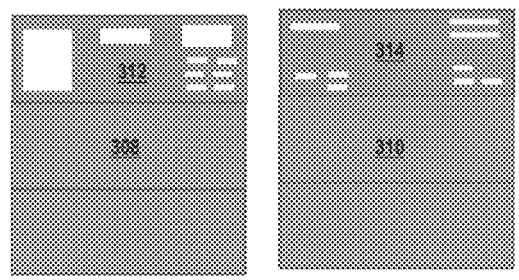
FIG. 3A                                    FIG. 3B

600

602 {

ABC Risk Services

604 — Invoice No. W18/2020-21

606

Buyer 1
San Mateo CA 94102
USA

608

ABC Risk Services West, Inc.
San Francisco CA Office
San Francisco CA 94105

610 612 614 616

| Client Account No. | Invoice Date | Currency | Account Executive |
|---|---|---|---|
| ACCX1234 | 04/10/2020 | US DOLLAR | Joe M. |

| Insurance Co. | Policy No. / Named Insured | Policy Term | Trans. Eff. Date | Description | Amount |
|---|---|---|---|---|---|
| ABC Risk Services Company | ABCRSW123321 | 05/01/2020 - 04/30/2021 | 05/01/2020 | Risk Services for Buyer 1 | |
| | | | | Premium | $1200 |
| | | | | Data and Analytics Charge | $96 |
| | | | | TOTAL INVOICE AMOUNT DUE | $1296 |

TO AVOID POTENTIAL DISRUPTION IN YOUR COVERAGE, PAYMENT IS DUE UPON RECEIPT.

Please Make Payment Payable to ABC Risk Services

*Please see last page for statement regarding compensation*

Page 1 of 3

This is a Reissued invoice

*Please detach here. Top portion is for your records, bottom portion to be returned with your payment.*

| Client Account No. | Invoice No. | Invoice Date | Currency | Amount Due |
|---|---|---|---|---|
| ACCX1234 | 006/2020-21 | 04/10/2020 | US DOLLAR | $1296 |

ABC Risk Services

626 → Buyer 2
Wobum MA 01801
USA

624 → Invoice No. S06/2019-20

628 → ABC Risk Services South, Inc.
Atlanta GA Office
Atlanta GA 30326

| Client Account No. | Invoice Date | Currency | Account Executive |
|---|---|---|---|
| ACCX5678 | 03/25/2019 | US DOLLAR | Casey G. |

| Insurance Co. | Policy No. / Named Insured | Policy Term | Trans. Eff. Date | Description | Amount |
|---|---|---|---|---|---|
| ABC Risk Services Company | ABCRSS456654 | 04/01/2019 - 03/31/2020 | 04/01/2020 | Risk Services for Buyer 2<br><br>Premium<br>Surplus Lines Tax | <br><br>$1020<br>$102 |
| | | | | TOTAL INVOICE AMOUNT DUE | $1122 |

TO AVOID POTENTIAL DISRUPTION IN YOUR COVERAGE, PAYMENT IS DUE UPON RECEIPT.
Please Make Payment Payable to ABC Risk Services

*Please see last page for statement regarding compensation*
Page 1 of 3

This is a Reissued invoice
*Please detach here. Top portion is for your records, bottom portion to be returned with your payment.*

| Client Account No. | Invoice No. | Invoice Date | Currency | Amount Due |
|---|---|---|---|---|
| ACCX5678 | S06/2019-20 | 03/25/2019 | US DOLLAR | $1122 |

ZONE X ← 644
CONSTRUCTION
WORKS
← 646
NORTH CANAL ST
SOUTH SAN FRANCISCO, CA
94080

↓ 648

| Bill To |
|---|
| Buyer 3
San Mateo CA 94402
USA |

Invoice

| 650 | 652 |
|---|---|
| Date | Invoice No. |
| 11/11/2019 | ZXINO101 |

| PO No (654) | Terms (656) | Due Date (658) |
|---|---|---|
|  | Net 30 | 12/01/2019 |

| Description | Amount |
|---|---|
| Constructions services for Buyer 3 | |
| Labor: | $1000 |
| Materials: | $2000 |
| Fee: | $500 |
| Total | $3500 |

FIG. 6C

| | | |
|---|---|---|
| 822 | Template Description | ABC Risk Services South, Inc. |
| | Line Item Top Anchor | Description |
| | Line Item Bottom Anchor | Surplus Lines Tax |
| | Header Anchors | N/A<br>Policy No./<br>N/A<br>Trans. Eff<br>N/A -> Description<br>N/A -> Total |
| | Line Item Mapping Rule Count | None |
| | Header Anchors | Invoice No. -> Invoice Number<br>Invoice Date -> Invoice Date<br>Currency -> Tax InOriginal Country Currency<br>Client Account No. -> Buyer Name<br>Client Account No. -> Buyer Address<br>Remit No: -> Seller Address<br>Remit No: -> Seller Address<br>Surplus Lines Tax -> Invoice Total Tax Amount<br>TOTAL INVOICE AMOUNT DUE -> Invoice Total Amount Excluding Tax |
| 824 | Page Dimension | 612 (W) x 792 (H) |
| | Producer | AFPL Ghostscript 8.54 |
| | Creator | Pscript.dll Version 5.2.2 |
| | Title | Crystal Reports ActiveX Designer – d676f56d7fd44efba7fce20d59f12ed7.rpt |
| | Author | svc-USNH867821 |
| | Keywords | |
| | Subject | |
| | DensityR(ight) | 8.2337185581303228 36 |
| | DensityL(eft) | 7.927561274509803921 |
| | First Image | 516, 32.56 - 560.52, 48.64:10.png |
| | Max Font | ONANSN+ArialMT 11.04 normal |
| | Min Font | ONANSN+ArialMT 6.96 normal |
| | Total Only | No |

FIG. 8B

| | |
|---|---|
| Template Description | ABC Risk Services Companies, Inc. |
| Line Item Top Anchor | Description |
| Line Item Bottom Anchor | TOTAL INVOICE AMOUNT DUE |
| Header Anchors | N/A<br>Policy No./<br>N/A<br>Trans. Eff<br>N/A -> Description<br>N/A -> Total |
| Line Item Mapping Rule Count | 1 (Remove row where the Total column is not mapped) |
| Header Anchors | Invoice No. -> Invoice Number<br>Invoice Date -> Invoice Date<br>Client Account No. -> Supplier's Buyer Customer ID<br>Invoice No. -> Buyer Name<br>Invoice No. -> Buyer Address<br>Remit No. -> Seller Address<br>TOTAL INVOICE AMOUNT DUE -> Invoice Total<br>Amount Excluding Tax<br>Invoice No. -> Seller Phone Number<br>Remit to: -> Seller Name<br>Swift No: -> Bank SWIFT Code<br>Account Name: -> Bank Account Name<br>Account No: -> Bank Account Number |
| Page Dimension | 612 (W) x 792 (H) |
| Producer | AFPL Ghostscript 8.54 |
| Creator | Pscript.dll Version 5.2.2 |
| Title | Crystal Reports ActiveX Designer –<br>373eba6df044de8bb48269e8b3d6fb3.rpt |
| Author | svc-USNH867821 |
| Keywords | |
| Subject | |
| Density R (right) | 8.7038465377302436 |
| Density L (left) | 5.9493941869677716379 |
| First Image | 516. 32.56 - 560.52, 48.64:10.png |
| Max Font | ONANSN+ArialMT 11.04 normal |
| Min Font | ONANSN+ArialMT 6.96 normal |
| Total Only | No |

900 ↗

902 ↗

ABC Risk Services

Invoice No. W18/2020-21

ABC Risk Services West, Inc.
San Francisco CA Office
San Francisco CA 94105

Buyer 1
San Mateo CA 94102
USA

| Client Account No. | Invoice Date | Currency | Account Executive |
|---|---|---|---|
| ACCX1234 | 04/10/2020 | US DOLLAR | Joe M. |

| Insurance Co. | Policy No. / Named Insured | Policy Term | Trans. Eff. Date | Description | Amount |
|---|---|---|---|---|---|
| ABC Risk Services Company | ABCRSW123321 | 05/01/2020 – 04/30/2021 | 05/01/2020 | Risk Services for Buyer 1 | $1200 |
| | | | | Premium Data and Analytics Charge | $96 |
| | | | | TOTAL INVOICE AMOUNT DUE | $1296 |

TO AVOID POTENTIAL DISRUPTION IN YOUR COVERAGE, PAYMENT IS DUE UPON RECEIPT.
Please Make Payment Payable to ABC Risk Services Please see last page for statement regarding compensation Page 1 of 3

This is a Reissued invoice

Please detach here. Top portion is for your records, bottom portion to be returned with your payment.

| Client Account No. | Invoice No. | Invoice Date | Currency | Amount Due |
|---|---|---|---|---|
| ACCX1234 | 006/2020-21 | 04/10/2020 | US DOLLAR | $1296 |

FIG. 9A

| | |
|---|---|
| Template Description | ABC Risk Services South, Inc. |
| Line Item Top Anchor | Description |
| Line Item Bottom Anchor | Surplus Lines Tax |
| Header Anchors | N/A<br>Policy No./<br>N/A<br>Trans. Eff<br>N/A -> Description<br>N/A -> Total |
| Line Item Mapping Rule Count | None |
| Header Anchors | Invoice No. -> Invoice Number<br>Invoice Date -> Invoice Date<br>Currency -> Tax InOriginal Country Currency<br>Client Account No. -> Buyer Name<br>Client Account No. -> Buyer Address<br>Remit No: -> Seller Address<br>Remit No: -> Seller Address<br>Surplus Lines Tax -> Invoice Total Tax Amount<br>TOTAL INVOICE AMOUNT DUE -> Invoice Total<br>Amount Excluding Tax |
| Page Dimension | 612 (W) x 792 (H) |
| Product | AFPL Ghostscript 8.54 |
| Creator | Pscript.dll Version 5.2.2 |
| Title | Crystal Reports ActiveX Designer –<br>d676f56d7d44efba7fce20d59f12ed7.rpt |
| Author | svc-USNH867821 |
| Keywords | |
| Subject | |
| Density(Right) | 8.2337 18558130322836 |
| Density(Left) | 7.927561274509803921 |
| First Image | 516, 32.56 - 560.52, 48.64:10.png |
| Max Font | ONANSN+AriaIMT 11.04 normal |
| Min Font | ONANSN+AriaIMT 6.96 normal |
| Total Only | No |

910

ABC Risk Services

Invoice No. S06/2019-20

Buyer 2
Woburn MA 01801
USA

ABC Risk Services South, Inc.
Atlanta GA Office
Atlanta GA 30326

| Client Account No. | Invoice Date | Currency | Account Executive |
|---|---|---|---|
| ACCX5678 | 03/25/2019 | US DOLLAR | Casey G. |

| Insurance Co. | Policy No. / Named Insured | Policy Term | Trans. Eff. Date | Description | | Amount |
|---|---|---|---|---|---|---|
| ABC Risk Services Company | ABCRSS456654 | 04/01/2019 - 03/31/2020 | 04/01/2020 | Risk Services for Buyer 2 | | |
| | | | | | Premium | $1020 |
| | | | | | Surplus Lines Tax | $102 |

| | |
|---|---|
| TOTAL INVOICE AMOUNT DUE | $1122 |

TO AVOID POTENTIAL DISRUPTION IN YOUR COVERAGE, PAYMENT IS DUE UPON RECEIPT.
Please Make Payment Payable to ABC Risk Services This is a Reissued invoice Please see last page for statement regarding compensation                         Page 1 of 3

Please detach here. Top portion is for your records, bottom portion to be returned with your payment.

| Client Account No. | Invoice No. | Invoice Date | Currency | Amount Due |
|---|---|---|---|---|
| ACCX5678 | S06/2019-20 | 03/25/2019 | US DOLLAR | $1122 |

| | |
|---|---|
| Template Description | Zone X Construction Works |
| Line Item Top Anchor | Amount |
| Line Item Bottom Anchor | Total |
| Line Item Column Header Map | Description -> Description<br>Amount -> Total |
| Line Item Mapping Rule Count | 2 (Remove row where the Total column is not mapped,<br>Cleanup non numeric values from the Total column) |
| Header Anchors | Invoice -> Document Label<br>Date -> Invoice Date<br>Bill To -> Buyer Name<br>Bill To -> Buyer Address<br>PO No -> PO Number<br>Terms -> Payment Term<br>Due Date -> Invoice Due Date<br>Description -> Unknown<br>Date -> Seller Address<br>Total -> Invoice Total Amount Excluding Tax<br>Www -> Seller Name |
| Page Dimension | 612 (W) x 792 (H) |
| Producer | Adobe Acrobat 8.1 |
| Creator | Adobe Acrobat 8.1 Combine Files |
| Title | |
| Author | |
| Keywords | |
| Subject | |
| Density(Right) | 7.7524253565506238859 |
| Density(Left) | 11.774084100812041988 |
| First Image | 40, 40, 0.80 - 184.40, 76.40:10.png |
| Max Font | QVDEWV+TimesNewRoman 20.96 normal |
| Min Font | QVDEWV+TimesNewRoman 9.94 normal |
| Total Only | No |

920 →

---

922 →

| | | | Invoice |
|---|---|---|---|
| ZONE X<br>CONSTRUCTION WORKS<br><br>NORTH CANAL ST<br>SOUTH SAN FRANCISCO, CA 94080 | | Date<br>11/11/2019 | Invoice No.<br>ZXINO101 |

| Bill To |
|---|
| Buyer 3<br>San Mateo CA 94402<br>USA |

| PO No | Terms | Due Date |
|---|---|---|
| | Net 30 | 12/01/2019 |

| Description | Amount |
|---|---|
| Constructions services for Buyer 3 | |
| | |
| Labor: | $1000 |
| Materials: | $2000 |
| Fee: | $500 |
| Total | $3500 |

TAX INVOICE / STATEMENT

TO Kelwright

GRAY BINS

PO BOX 6106 DUBBO 2830
ABN 82 800 378 662

| QTY | DESCRIPTION | PRICE | G.S.T. | TOTAL | |
|---|---|---|---|---|---|
| | hook bin hire delivered to Castlereagh Hotel | | | 480 | 00 |
| | hook bin hire change over (heavy rate) Castlereagh Hotel | | | 550 | 00 |
| | hook bin hire change over (heavy rate) Castlereagh Hotel | | | 550 | 00 |
| | | | Balance Outstanding | $1580 | 00 |

FIG. 10

AUTOMATIC SELECTION OF TEMPLATES FOR EXTRACTION OF DATA FROM ELECTRONIC DOCUMENTS

BENEFIT CLAIM

This application claims the benefit under 35 U.S.C. 119 of provisional application 63/057,146, filed Jul. 27, 2020, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2019-2020 Coupa Software Incorporated.

FIELD OF THE DISCLOSURE

One technical field of the present disclosure is computer-implemented extraction of data from electronic documents. Another field is computer-assisted search systems. Yet another technical field is computer-implemented electronic procurement or e-procurement systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Computer-implemented software-as-a-service (SaaS) systems are now available for a variety of data processing applications. These systems typically offer complex, sophisticated internal data processing applications. However, to provide useful output, the systems must receive input data that is capable of storage, transformation, display and other analysis. In enterprises of all sizes, communication of data commonly relies on preparing and transmitting, from one party to another, digital electronic documents in a particular format. For example, portable document format (PDF) is widely used. Unfortunately, the substantive content of PDF documents is not inherently readable by some SaaS systems.

As an example, e-procurement systems have been developed to assist enterprises in tracking and planning purchasing and sourcing operations at high volume. When buyers use these systems to order goods or services, suppliers create invoices, often in PDF, that they transmit to buyers for payment. However, the substantive data represented in PDF invoices—which may arrive at the SaaS system in large quantities, such as thousands or millions—cannot be read directly from the PDF document and entered into database records of the SaaS system. Further, the format of even simple documents such as invoices will vary among many different suppliers; for example, the tax ID of the supplier may appear in the top center of one invoice, and in the bottom right, within a box, in another invoice. Therefore, the PDF document must be processed using a computer-assisted extraction process in which software routines scan the document and use programmed algorithms to determine what data is likely located in specific positions, extract the data and pass it to the SaaS system.

Enterprises using these systems also commonly receive many copies from the same supplier that have the same general format. To speed up data extraction, an extraction template guides the software routines to determine how to extract data. However, in an environment involving thousands of suppliers each having different document formats, merely selecting the correct template becomes a time-consuming, complex problem. Thus, there is a need for ways to substantially reduce the data processing time involved, and the resources that are used, to select the correct template for electronic document extraction.

The techniques disclosed in U.S. Pat. Nos. 10,127,444 and 10,325,149 are within similar technical fields.

SUMMARY OF THE INVENTION

The appended claims may serve as a summary of the invention.

BRIEF DESCRIPTION OF THE DRAWINGS

In the drawings:

FIG. 2 illustrates functional elements and data flows of a computer-implemented method that may be programmed to implement an embodiment.

FIG. 3A schematically illustrates three input electronic documents of different sizes.

FIG. 3B schematically illustrates two input electronic documents of different layouts.

FIG. 6A, FIG. 6B, FIG. 6C illustrate example input electronic documents.

FIG. 8A, FIG. 8B, FIG. 8C illustrate example candidate templates selected for extracting data from an input electronic document.

FIG. 9A, FIG. 9B, FIG. 9C illustrate example templates for a set of input electronic documents.

FIG. 10 illustrates an example handwritten invoice.

DETAILED DESCRIPTION OF EXAMPLE EMBODIMENTS

Figure 1:
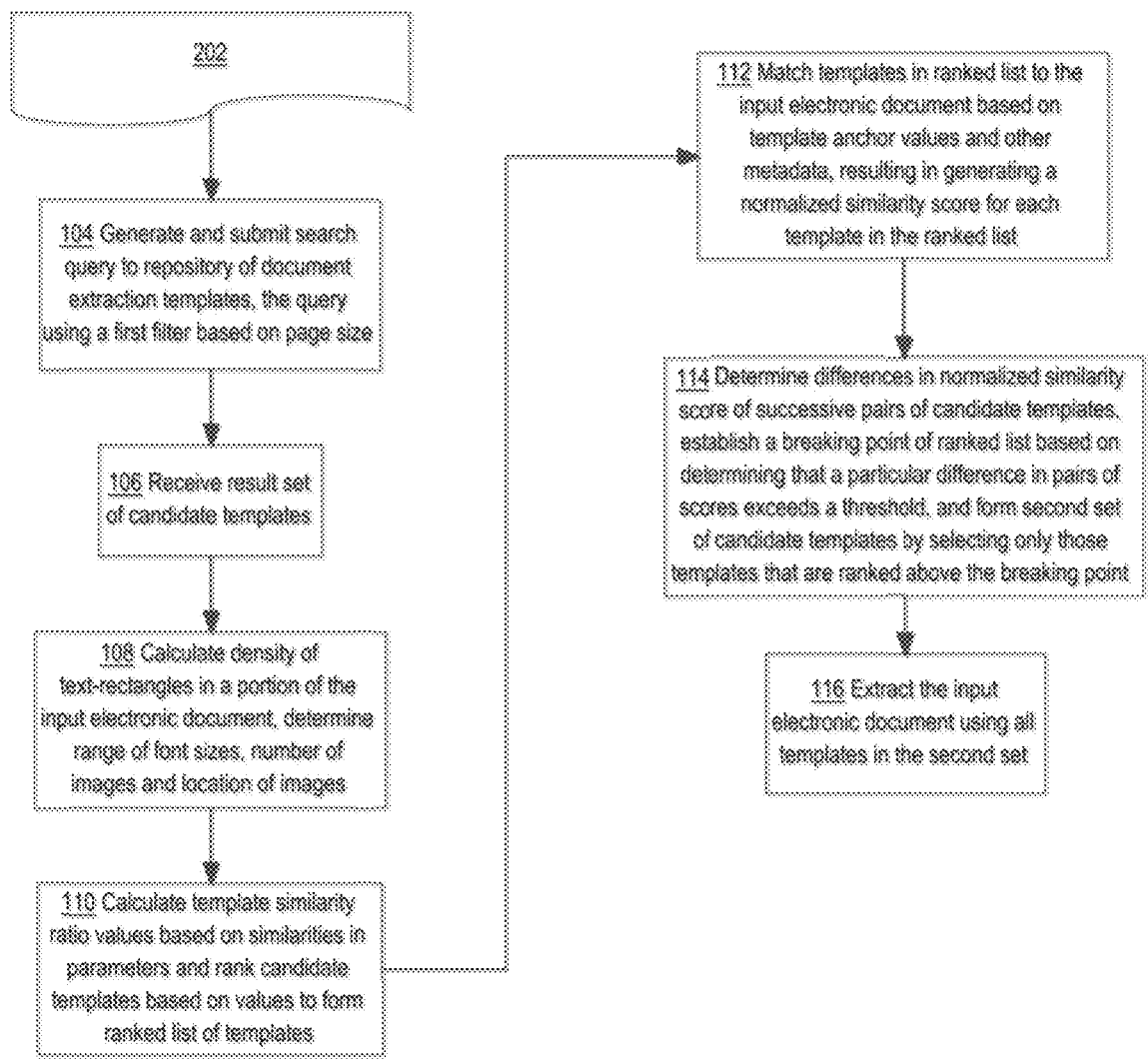
FIG. 1 illustrates a flow diagram of an algorithm that may be programmed to implement an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments provide an efficient, flexible search engine for matching an input electronic document to the best possible template for use in subsequent data extraction steps, based upon a repository of a large number of templates, many of which may be similar. In one embodiment, the input electronic document is a commercial invoice in PDF, but other embodiments may be implemented for other kinds of documents and the specific content of the input electronic document is not critical.

For purposes of this disclosure, the following terms have the following meanings:

Text Rectangle: Combined unit of the actual text value and how it is rendered on the page, such as its font attributes and the two-dimensional location it occupied in the document, using Cartesian coordinates.

Anchor: Document element(s), such as Text Rectangle(s), that can be used as a key location to anchor a particular data extraction area. An anchor is found in the document before the corresponding value is extracted. An example of an anchor is text such as "Invoice No:". If this text is found, then a process can be programmed to instruct an extraction engine to find text that might be in the area below, to be extracted as the actual Invoice Number.

Top Anchor: document element(s), such as Text Rectangle(s), that can be used to determine the beginning boundary of the line item section in the document.

Bottom Anchor: document element(s), such as Text Rectangle(s), that can be used to determine the ending boundary of the line item section in the document.

Anchor Rules: Extraction rule(s) that can be attached to an anchor to do post-extraction processing such as removing unnecessary spaces, alphabet, and others.

Mapping Rules: Extraction rule(s) that are more general and not specific to an anchor that might apply to the line items for cleanup, transformation, or the entire document itself.

Column Headers: In the context of financial document extraction, column headers are the document element(s) such as Text Rectangle(s) that can be used to identify each line item element, such as Product Code, Item Description, Quantity, Unit of Measure, and Total.

In an embodiment, the search engine is programmed specifically for template search and generates output that ranks candidate templates based on how likely the templates are to correctly extract data from the input electronic document. The search engine includes a programmed algorithm to determine how many of the candidate templates should be used to perform extraction, and a separate component to validate extraction results from the different templates to result in final extraction results. Using this approach, templates created for specified invoices can be accurately used repeatedly for new input electronic documents. Furthermore, the template for one supplier also can be used for different suppliers and can extract data from their invoices without a need to create a new template. For instance, templates 900, 910, and 920 created for invoices 902, 912, and 922, respectively, as shown in FIG. 9A, FIG. 9B, FIG. 9C, can be reused to extract data from different invoices associated with different suppliers. By way of an example, the template 900 created for the invoice 902 can be reused for extracting data from invoice 640 of FIG. 6C even though the template 900 was created for a different supplier.

Embodiments have been implemented on a research basis and have achieved 99% accuracy in selecting templates that accurately extract electronic invoices, compared to about 94% accuracy for prior techniques. This is a substantial improvement in accuracy that virtually eliminates the need for human review of input electronic documents or manual intervention in the selection of templates.

FIG. 1 illustrates a flow diagram of an algorithm that may be programmed to implement an embodiment. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of selecting extraction templates for use in electronic document data extraction. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

As an overview, the process of FIG. 1 is generally directed to filtering or selecting templates, from among a large digitally stored set of templates, using a three-step process. The result is automatic, computer-implemented selection of a subset of candidate templates to use to extract data from an input electronic document. In an embodiment, the subset comprises between three to ten candidate templates, but other embodiments may use subsets of other sizes. The candidates in the subset are used to extract data from the input electronic document, and a set of selection instructions programmatically determine which extraction operation produced the best results for the input electronic document. Each of the steps illustrated in FIG. 1 is discussed below with reference to FIG. 2. In particular, step 104 to step 116 of FIG. 1, inclusive, are discussed below with respect to thumbprint search process 204 of FIG. 2.

FIG. 2 illustrates functional elements and data flows of a computer-implemented method that may be programmed to implement an embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Figure 7:
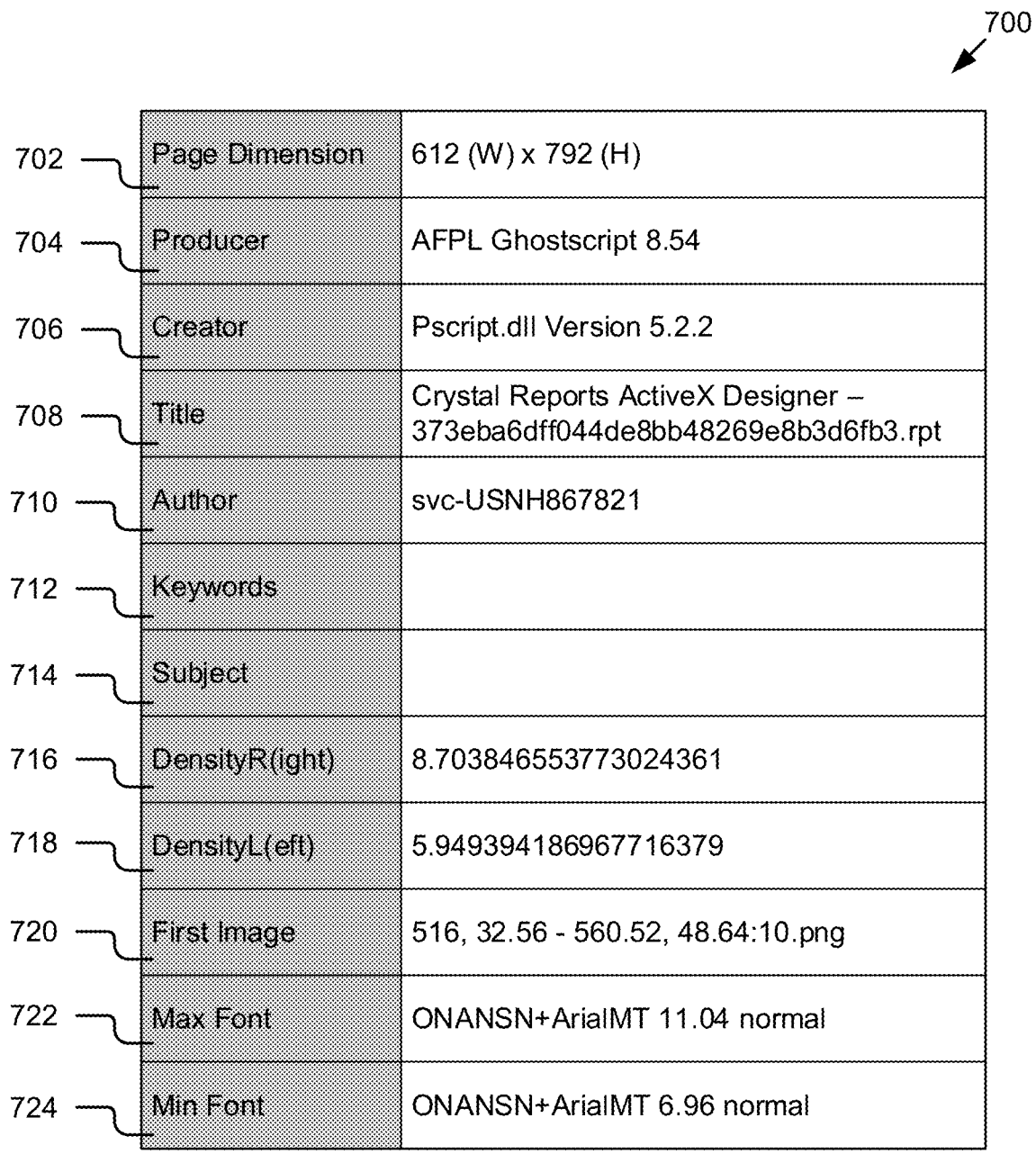
FIG. 7 illustrates example metadata or parameters associated with an example input electronic document.

Referring first to FIG. 2, in an embodiment, an input electronic document 202, such as invoice 600 of FIG. 6A, is received programmatically at a set of thumbprint search instructions 204. In an embodiment, rather than attempting to match the entire input electronic document 202 to templates, data values or attributes for certain elements of the document are selected and used. For example, the locations of text-rectangles in the top third of the input electronic document 202 may be identified and stored in metadata that is used in later steps. FIG. 7 illustrates example metadata or parameters 700 that may be derived from an input electronic document. Examples of parameters 700 include data values or attribute values. In particular, FIG. 7 illustrates example parameters 700 that are associated with the invoice 600 of FIG. 6A. The example parameters 700 may include a page dimension 702, a producer 704, a creator 706, a title 708, an author 710, keywords 712, a subject 714, a density value 716 of right region, a density value 718 of left region, a first image 720, a maximum font size 722, a minimum font size 724, etc. It should be noted that the list of parameters 700 is not by any means limiting and various other parameters (e.g., data values and/or attributes) are possible and within the scope of the present disclosure. The thumbprint search instructions 204 may be implemented using the process of FIG. 1.

In various embodiments, an input electronic document may comprise an invoice, a purchase order, a credit memo, or any other form of electronic document that is amenable to data extraction based on the use of a template. For example, the input electronic document may be an invoice received from a specific supplier to a buyer, as shown in FIG. 6A, FIG. 6B, FIG. 6C. The substantive or descriptive content of the document is not critical to an implementation. In some embodiments, the input electronic document is digitally stored in portable document format (PDF), but the use of PDF is not required for all embodiments. Receiving a document may comprise programmatically opening and reading a document that has been stored in a folder, programmatically calling a subroutine with a pathname, network location or other pointer to a document that can be opened and read, receiving input in a graphical user interface (GUI) to drag and drop a name of an electronic document from a folder into a program window, or other techniques.

At step 104, in an embodiment, the process generates and submits a search query to a repository of document extraction templates, the query using a first filter based on page size. Thus, the first filter applied to the templates is page size or dimension, such as the page dimension 702 as shown in FIG. 7. The inventors have found, in an inventive moment, that page size is a reliable metadata value to use as a basis to exclude templates that are not able to extract a particular invoice. FIG. 3A schematically illustrates three input electronic documents of different sizes. Referring now to FIG. 3A, it will be seen that example documents 302, 304, 306 have substantially different page sizes, so that a template for one of the documents 302 is unable to extract information accurately or completely from the other documents 304, 306, due to differences in page sizes.

In other embodiments, multiple filters may be used. For example, in one embodiment, two filters are used:

Filter 1. Document level. Author, Producer, Title, Creator, Density Left, Density Right, Minimum Size Font Attributes, Maximum Size Font Attributes, Party Name, Images.

Filter 2. Text Rectangle and Template level.

Template Description, Template Count, Is Total Only

Bottom Anchor, Top Anchor, Matched Anchors, Number of Anchors, Anchor Rules

Mapping Rules, Number of Column Headers, Column Header Matched

The repository of document extraction templates may store a large number of templates that have been created over time. In one practical embodiment, the repository stores in excess of 125,000 different templates. Any number of templates may be stored in any form of electronic digital storage repository, database, flat file system, or other storage.

Figure 8A:
Figure 8C:
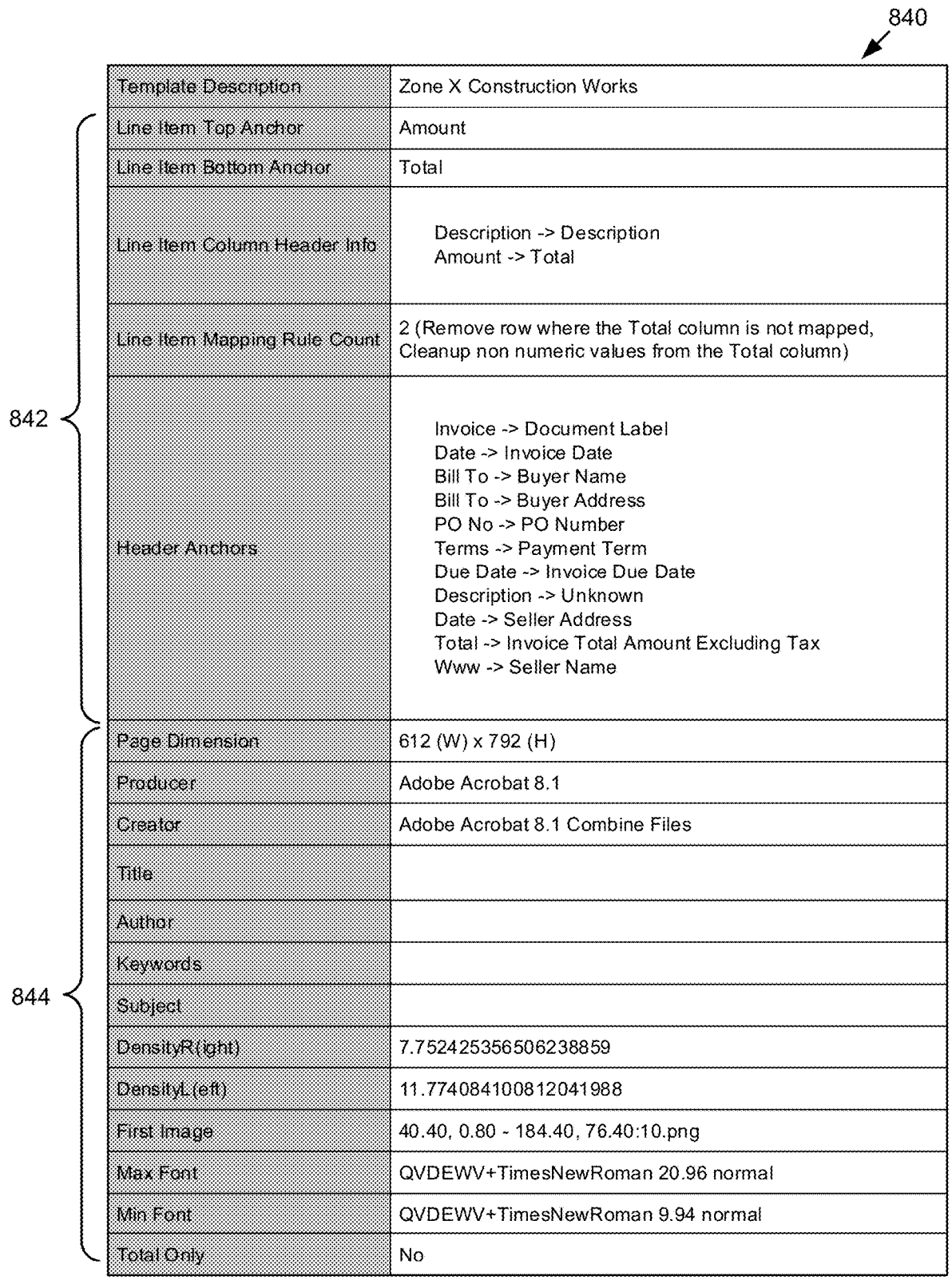

At step 106, the process receives a result set of candidate templates that have been filtered based on page size using the query of step 104. For example, the result set may include candidate templates 800, 820, and 840 of FIG. 8A, FIG. 8B, FIG. 8C that have been filtered based on the page size 702 associated with the invoice 600. In other words, the resulting candidate templates 800, 820, and 840 are capable of extracting data from an input electronic document for a page dimension of "612 (W)×792 (H)." The result set may contain any number of templates, and examples are known in which thousands of templates appeared in the result set.

In an embodiment, in response to receiving the input electronic document, such as document 600 of FIG. 6A) at step 202, when the document is in PDF, the process 204 may be programmed to read metadata from the PDF file, including metadata values such as Author, Producer, Title, Creator, as shown in FIG. 7. In an embodiment, at step 108, the process also calculates the density of all text-rectangles in the top third of the invoice. For invoices and similar electronic documents, the majority of the information in the top third includes key data values such as supplier identifying information, as well as other data that is usually the same for every other invoice from that supplier.

For example, in an embodiment, step 108 also is programmed to calculate the maximum and minimum font size in the top third of the document, and the number of images that are used in that space, and the location of the first image. These attributes also have been discovered to depend on the supplier and the layout of its invoices and have been discovered to be valuable to find the best templates to extract the invoice. FIG. 3B schematically illustrates two input electronic documents of different layouts. In the example of FIG. 3B, two input electronic documents 308, 310 comprising invoices are about the same size, but have different elements in the top third 312, 314 of the documents respectively. It will be apparent that elements of the top third 312, 314 usually will disambiguate one document from another, especially in the case of electronic invoices.

As another example, FIG. 6A, FIG. 6B, FIG. 6C illustrate three example invoices 600, 620, and 640. The invoices 600, 620 are from the same supplier "ABC Risk Services" and the invoice 640 is from a different supplier "ZONE X Construction Works". Since the invoices 600, 620 are from the same supplier, the top-third areas 602, 622 of these invoices share a similar layout. A similar layout, in this context, refers to similar locations or placement of various rectangles/boxes, number of images, and/or font sizes. Areas 602, 622 also share a similar type of information. For instance, the top-third area 602 of the invoice 600 includes invoice number 604, buyer information 606, supplier information 608, client account number 610, invoice date 612, currency 614, and account executive 616. Similarly, the top-third area 622 of the invoice 620 includes invoice number 624, buyer information 626, supplier information 628, client account number 630, invoice date 632, currency 634, and account executive 636. On the other hand, the top-third area 642 of the invoice 640 being from a different supplier has a different layout and includes, in this case, supplier information including supplier name 644 and supplier address 646, buyer information 648, invoice date 650, invoice number 652, PO No. 654, terms 656, and due date 658.

Consequently, the top-third area of an invoice includes data values having a useful role in selecting or filtering templates for data extraction from the invoice. As an example, the information included in the top-third area 602 of the invoice 600 combined with the metadata/parameters 700 may be used under stored program control for automatically choosing a template 800 of FIG. 8A for the data extraction, as discussed in further detail below.

At step 110, the process calculates a template similarity ratio value based on similarities of parameters of templates to parameters of the input electronic document, and ranks the candidate templates in the result set (step 106) based on the template similarity ratio values to form a ranked list of templates. The rationale of this step is that when the parameter values of a particular template are similar to the same parameter values of the input electronic document, then that particular template is likely to be able to accurately extract the invoice. Ranking the templates based on the relative similarities they have in above parameters provides a basis for selecting a further set of templates, all of which are likely to be effective in extracting the document.

Step 110 is further described with respect to FIG. 6A, FIG. 7, FIG. 8A, FIG. 8B, FIG. 8C. Each of the templates 800, 820, 840 of FIG. 8A, FIG. 8B, FIG. 8C includes a set of parameters. For simplicity and ease of understanding, a subset 804, 824, 844 of these parameters are described herein for comparing with the parameters/metadata 700 of the invoice 600. For instance, the methods herein may be programmed to use a subset 804 of parameters of the template 800 for calculating a template similarity ratio value based on similarity of parameters of the template 800 to the parameters 700 of the input electronic document 600. Similarity, the methods may be programmed to use subsets 824, 844 of the templates 820, 840 respectively for the similarity comparison to calculate the template similarity ratio value. As can be seen from the drawing figures, all the parameters of the subset 804 of the template 800 are similar to the parameters 700 of the invoice 600, and most of the parameters of the subset 824 of the template 820 are similar to the parameters 700 of the invoice 600. For example, most of the parameters of the template 820 are similar except the parameters 708, 716, 718 However, only a few of the parameters of the subset 844 of the template 840 are similar to the parameters 700 of the invoice 600. For example, only parameter 702 is similar and the rest are different. Based on the similarity comparison, the methods here may be programmed to determine that the template 800 has the highest template similarity ratio value because ten parameters of the template 800 are similar to the invoice parameters 700, the template 820 has a moderate template similarity ratio value because seven parameters of the template 820 are similar to the invoice parameters 700, and the template 840 has the lowest template similarity ratio because one parameter of the template 840 is similar to the invoice parameters 700). Once the template similarity ratio value is calculated for each of the candidate templates 800, 820, 840, a rank may be assigned accordingly. For instance, since the template 800 has the highest template similarity ratio value, it is assigned a rank "1", template 820 with moderate template similarity ratio value is assigned a rank "2", and template 840 with the lowest template similarity ratio value is assigned a rank "3".

In an embodiment, at step 112, the templates in the ranked list are matched to the input electronic document based on template anchor values and other metadata, resulting in generating a normalized similarity score for each template in the ranked list. As an example, each of the ranked candidate templates 800, 820, 840 is matched to the invoice 600 based on their respective template anchor values 802, 822, 842 and the parameters 804, 824, 844, and a normalized similarity score is generated for the ranked candidate template. The generated normalized similarity score for each of the candidate templates 800, 820, 840 indicates a measure of similarity of the template to the input electronic document, such as invoice 600, where a template with high normalized similarity score indicates a high likelihood of the template being selected for extracting data from the input electronic document. A normalized similarity score is used because two different suppliers may use invoices with similar patterns of data, yet templates from the first invoice cannot extract the second one. In an embodiment, template anchor values and other metadata are used for matching those against the invoice.

In an embodiment, the following specific parameters are used to match an input electronic document with a template:

```
public int AnchorMatchCount { get; set; }          // Number of matching anchor
found in the document
public decimal AnchorPatternSum { get; set; }      // Total score for matching
anchor texts and how close it is to the template anchors location
public int AnchorTextRectanglesCount { get; set; } //
NumberOfAnchorsInAutoThumbprint
public decimal ColumnPatternSum { get; set; }      // Total score for matching
column header texts and how close it is to the template column headers location
public int ColumnTextRectanglesCount { get; set; } // Number of matching column
header found in the document
public bool TopAnchorFound { get; set; }           // IsTopAnchorMatched
public bool BottomAnchorFound { get; set; }        // IsBottomAnchorMatched
public bool SupplierNameFound { get; set; }        //
IsTemplateDescriptionMatched
public int AnchorRulesCount { get; set; }          //
NumberOfAnchorRulesInAutoThumbprint
public int MappingRulesCount { get; set; }         //
NumberofMappingRulesInAutoThumbprint
public int ColumnsCount { get; set; }              //
NumberofColumnsInAutoThumbprint
public double AbsLeftDensityDiff { get; set; }     // DensityLDifference
public double AbsRightDensityDiff { get; set; }    // DensityRDifference
public bool IsTotalOnly { get; set; }              // Whether or not the template is
total only
public int UsageCount { get; set; }                // Number of times the template
has been used previously
```

In this context, certain terms used above have the following definitions:
Template Description (supplier name)
Template usage Count (how many times that template used in the past)
IsTotalOnly (If template has line items or not)
BottomAnchor (the word written at the bottom of the line items, e.g. 'Subtotal')
TopAnchor (the word written at the top of the line items, e.g. 'Description')
Matched Anchors (labels inside the template against word found inside the invoice, it should be in the similar position, we do fuzzy matching on this)
Number of Anchors (how many anchors mapped inside that template, the more anchor the better the quality of that template)
Anchor Rules (how many especial rules exist in that template; the more rules mean more accuracy)

Mapping Rules (how many rules has been created for extracting line items, the more the better)

Number of Column Headers, (how many columns exist in line items)

Column Header Matched (how many column headers matching the invoice)

In an embodiment, raw template similarity values are normalized using the following formula:
//Calculated Ratios:
 public double AnchorMatchRatio {get; set;}
 public double TotalOnlyWeight {get; set;}
 public double Density {get; set;}
 public double LineItemAnchorRatio {get; set;}
 public double FrequencyRatio {get; set;}
 public double UsageCountRatio {get; set;}
 public double AnchorCountRatio {get; set;}
 public double RuleRatioExponential {get; set;}
 public double SupplierMatchRatio {get; set;}
 public double ColumnMatchRatio {get; set;} reliabilityScore=sum(calculated ratios)

ReliabilityScore=Math.Exp(−1/reliabilityScore)

As a result, each template receives a ranking value between 0-1. However, extracting data from an electronic input document using every template consumes excessive processing time and CPU cycles. In a system that processes thousands of input documents per day, using extraction with ten or more templates may be unnecessary or impractical. Therefore, in one embodiment, the best three to ten templates are used for extraction of a particular input electronic document. Finding the best templates uses a breaking point search algorithm as now described.

At step 114, the process determines differences in normalized similarity scores of successive pairs of candidate templates, establishes a breaking point in the ranked list based on determining that a particular difference in pairs of scores exceeds a threshold, and forms a second set of candidate templates by selecting only those templates that are ranked above the breaking point.

Figure 4:
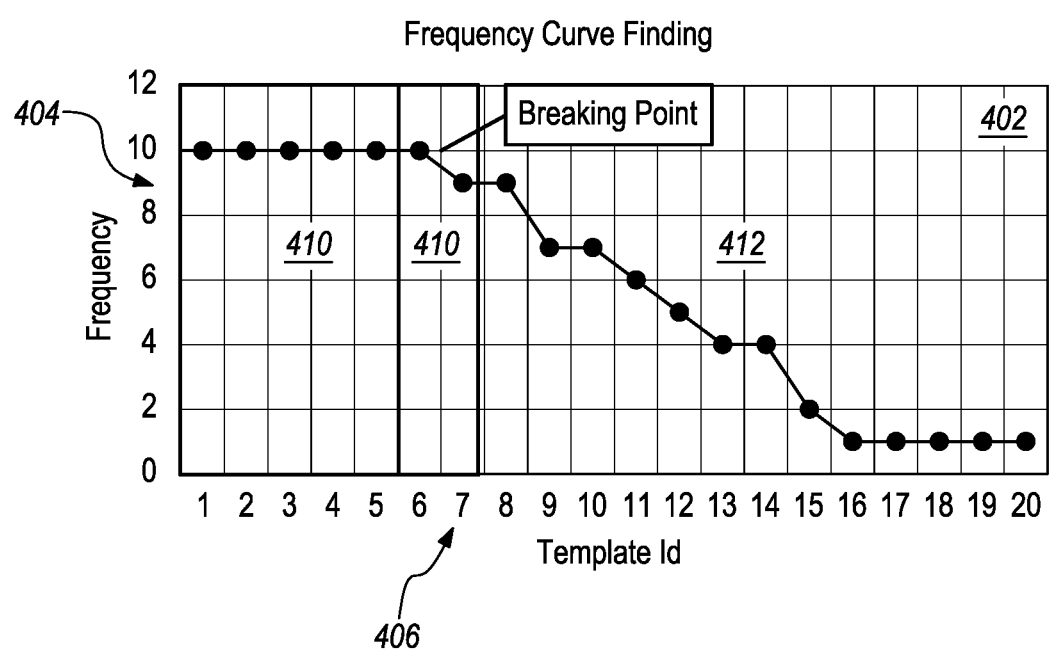
FIG. 4 illustrates a graph of example data values that may be derived from ranking similar extraction templates for use in determining subsets of extraction templates.

After the ranking of step 110, the process may have yielded only a few templates, or could have thousands of candidate templates. FIG. 4 illustrates a graph of example data values that may be derived from ranking similar extraction templates for use in determining subsets of extraction templates. In FIG. 4, a graph 402 comprises a plurality of data points organized using a first axis 404 for Frequency and a second axis 406 for Template Identifier. In an embodiment, template similarity ratio value may be termed Frequency. When template Frequency values are ranked in this manner, a graphical view such as FIG. 4 will include a breaking point. In an embodiment, a first set of templates 408 is above the breaking point, a second set of templates 410 is at or near the breaking point, and a third set of templates 412 is below the breaking point. While the breaking point is easy to visualize in such a graph, in an embodiment, the process of FIG. 1 is programmed with an algorithmic basis to identify the breaking point.

Referring again to FIG. 4, assuming that candidate templates include five plot points horizontally in set 408, all five frequency values are the same, so there is one distinct frequency value. In response, the process is programmed to expand the search field slightly to include set 410. Review of the values then includes seven values instead of five, corresponding to template identifiers "1" to "7". Inspection of these values indicates two distinct frequencies of "9" and "10". Since more than one distinct frequency value has been found, the breaking point has been found. In response, the process then uses only the first seven templates as candidates for further processing.

In an embodiment, the minimum number of templates considered in such a search is 500, and the maximum is 2,500. The process stops inspecting frequency values in response to identifying more than one distinct frequency value. The search space is successively increased by 20% and values within the increased search space are re-inspected until about 2,500 values have been inspected, or until the breaking point is found. The result is a smaller ranked list of candidate templates to consider in later processing.

In an embodiment, the following calculation is used to determine the cutoff point:

standarddeviation=sqrt(sum((Score−mean(Score))^2)/(n))

Diff<−Score [−length(Score)]−Score [−1]

which(Diff>standarddeviation)

Using this approach, if the difference between two consecutive numbers is greater than the standard deviation, that number will be treated as a breaking point (cutoff point) and only templates before that will be selected for extraction.

At this point, in an embodiment, between 0 to 10 successful extraction results are available. Referring again to FIG. 2, in an embodiment, the results (e.g., candidate templates 800, 820, and 840 and their associated rankings and/or normalized similarity scores) of the foregoing process are programmatically passed to template chooser 206. In an embodiment, template chooser 206 is programmed to analyze the extracted results and determine one or more templates among the candidate templates that are best suitable for extracting data from the input electronic document 202. By way of an example, the template chooser 206 may select the template 800 for extracting the invoice 600 based on the template 800 having the highest ranking and/or normalized similarity score among other candidate templates 820, 840, as discussed elsewhere herein.

At step 116, the template chooser 206 extracts data from the input electronic document 202 using the one or more templates selected in step 114. FIG. 9A, FIG. 9B, FIG. 9C illustrate example templates that are selected by the process described herein for extracting data from a set of invoices. In particular, FIG. 9A illustrates that the template 900 is selected from a plurality of templates for extracting the invoice 902. FIG. 9B illustrates that the template 910 is selected from the plurality of templates for extracting the invoice 912. FIG. 9C illustrates that the template 920 is selected from the plurality of templates for extracting the invoice 922.

In an embodiment, template chooser 206 implements rules such as:

1. The more fields that were extracted, the better the template is.

2. Templates with more columns that successfully extracted the invoice are better than a template with fewer column headers.

3. In a successful extraction of an invoice, for every invoice line, a description field and an amount field must exist.

Based on applying the foregoing rules programmatically, if any of the extraction results is qualified, then the invoice has been extracted correctly, and control transfers to extraction component 212 at which multiple other similar electronic documents may be processed using the selected template. Extracted data may be programmatically transferred to an end-user 214, or to another system, such as an e-procurement system. Execution of extraction component 212 may yield one or more extraction errors 216, which are programmatically transferred to a mapping team 210 for evaluation or modification of the template.

If none of the extraction results qualified, then control transfers to auto suggest component 208. The auto suggest component 208 is programmed to apply machine learning-based technologies to the input electronic document 202 to attempt extraction using other means. In an embodiment, the techniques disclosed in U.S. Pat. No. 10,127,444 or 10,325,149 may be used.

If the auto suggest component 208 cannot extract the input electronic document 202, then the document is transferred to the mapping team 210 to create a new template for that document or to manually extract the data from the document. For example, handwritten invoices, such as the handwritten invoice 1000 as shown in FIG. 10, cannot be processed by the process discussed herein and therefore, the invoice may be transferred to the mapping team 210 to manually process the invoice. Transfer in this context, may occur via a programmatically generated e-mail message, text message, application alert, or other programmatically generated notification.

The end-user 214 may communicate a template support request 218 to the mapping team 210. Communicating, in this context, may occur via a programmatically generated e-mail message, text message, in-application option or function, or other programmatically generated notification.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
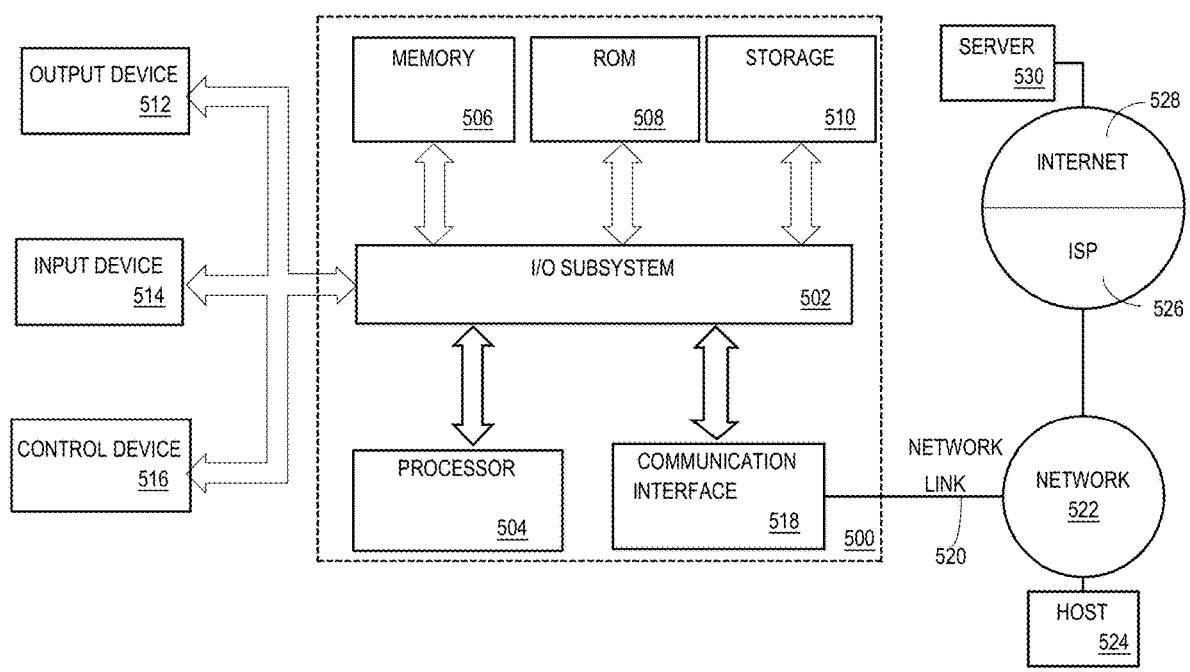
FIG. 5 illustrates a computer system that may be used to implement embodiments.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display.

Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    programmatically receiving a first set of candidate templates and an input electronic document;
    calculating a density value representing a density of text-rectangles in a portion of the input electronic document;
    for each particular candidate template from among the candidate templates in the first set, calculating a template similarity ratio value that represents a similarity of the particular candidate template to the input electronic document, resulting in digitally storing a plurality of template similarity ratios;

programmatically ranking the candidate templates according to the template similarity ratios;

matching the candidate templates to the input electronic document, resulting in generating a normalized similarity score for each particular candidate template from among the candidate templates;

determining differences in normalized similarity scores of successive pairs of the candidate templates;

when a particular difference in the normalized similar scores of a particular pair of the candidate templates exceeds a specified threshold value, establishing a breaking point of the candidate templates at the particular pair;

forming a second set of candidate templates by selecting, from among the candidate templates, only those candidate templates that are ranked above the breaking point;

extracting data from the input electronic document using the second set of candidate templates.

2. The computer-implemented method of claim 1, further comprising, before calculating the template similarity ratio value, determining a range of font sizes, a number of images, and a location of the images in the input electronic document.

3. The computer-implemented method of claim 2, further comprising calculating each template similarity ratio value based on similarities of parameters of the particular candidate template to the density value, the range of font sizes, the number of images, and the location of images that were calculated for the input electronic document.

4. The computer-implemented method of claim 1, further comprising calculating each template similarity ratio value based on similarities of parameters of the particular candidate template to the density value that was calculated for the input electronic document.

5. The computer-implemented method of claim 1, further comprising matching the candidate templates to the input electronic document based on template anchor values.

6. The computer-implemented method of claim 1, further comprising, before programmatically receiving the first set of candidate templates and the input electronic document, generating and submitting a search query to an electronic digital storage device storing a repository of electronic document extraction templates, the search query using a first filter based upon a page size of the input electronic document, the first set of candidate templates being received as the first set in response to the search query.

7. The computer-implemented method of claim 1, further comprising, before programmatically receiving the first set of candidate templates and the input electronic document, generating and submitting a search query to an electronic digital storage device storing a repository of electronic document extraction templates, the search query using a first filter specifying document level attributes and a second filter specifying text rectangle and template-level attributes.

8. The computer-implemented method of claim 7, the first filter specifying author, producer, title, creator, density left, density right, minimum size font attributes, maximum size font attributes, party name, and images; the second filter specifying template description, template county, bottom anchor, top anchor, matched anchors, number of anchors, anchor rules, mapping rules, number of column headers, column header matched.

9. The computer-implemented method of claim 1, the input electronic document comprising a Portable Document Format (PDF) file; further comprising, before calculating the template similarity ratio value, reading document metadata of the PDF file and using the document metadata as part of calculating the template similarity ratio.

10. The computer-implemented method of claim 1, the input electronic document comprising a Portable Document Format (PDF) file stored in an electronic digital storage device and representing any one of an invoice, a purchase order, or a credit memorandum.

11. The computer-implemented method of claim 1, further comprising:

after executing the extracting data from the input electronic document using the second set of candidate templates:

programmatically passing results of the extracting data to a template chooser process that is programmed to determine which extraction is best, based on whether more fields were extracted, templates with more columns that were successfully extracted, and whether every invoice line comprises a description field and an amount field;

processing multiple other similar electronic documents using a template for which extraction results are qualified based on the template chooser process.

12. A computer-implemented method comprising:

programmatically obtaining read access to an electronic digital storage device storing a repository of electronic document extraction templates;

programmatically generating and submitting a search query to the repository and, in response to the search query, receiving a first set of candidate templates;

programmatically receiving and reading an input electronic document;

based on reading, calculating a density value representing a density of text-rectangles in a portion of the input electronic document, determining a range of font sizes, a number of images, and a location of the images in the input electronic document;

for each particular candidate template from among the candidate templates in the first set, calculating a template similarity ratio value based on similarities of parameters of the particular candidate template to the density value, the range of font sizes, the number of images, and the location of images that were calculated for the input electronic document, resulting in digitally storing a plurality of template similarity ratios;

programmatically ranking the candidate templates according to the template similarity ratios;

matching the candidate templates to the input electronic document based on template anchor values, resulting in generating a normalized similarity score for each particular candidate template from among the candidate templates;

determining differences in normalized similarity scores of successive pairs of the candidate templates;

when a particular difference in the normalized similar scores of a particular pair of the candidate templates exceeds a threshold, establishing a breaking point of the candidate templates at the particular pair;

forming a second set of candidate templates by selecting, from among the candidate templates, only those candidate templates that are ranked above the breaking point;

extracting data from the input electronic document using the second set of candidate templates.

13. The computer-implemented method of claim 12, the search query using a first filter based upon a page size of the input electronic document, the first set of candidate templates being received as a result set in response to the search query.

14. The computer-implemented method of claim 12, the search query using a first filter specifying document level attributes and a second filter specifying text rectangle and template-level attributes.

15. The computer-implemented method of claim 14, the first filter specifying author, producer, title, creator, density left, density right, minimum size font attributes, maximum size font attributes, party name, and images; the second filter specifying template description, template county, bottom anchor, top anchor, matched anchors, number of anchors, anchor rules, mapping rules, number of column headers, column header matched.

16. The computer-implemented method of claim 12, the input electronic document comprising a Portable Document Format (PDF) file; further comprising, before calculating the template similarity ratio value, reading document metadata of the PDF file and using the document metadata as part of calculating the template similarity ratio.

17. The computer-implemented method of claim 12, the input electronic document comprising a Portable Document Format (PDF) file stored in an electronic digital storage device and representing any one of an invoice, a purchase order, or a credit memorandum.

18. The computer-implemented method of claim 12, further comprising:
- after executing the extracting data from the input electronic document using the second set of candidate templates:
- programmatically passing results of the extracting data to a template chooser process that is programmed to determine which extraction is best, based on whether more fields were extracted, templates with more columns that were successfully extracted, and whether every invoice line comprises a description field and an amount field;
- processing multiple other similar electronic documents using a template for which extraction results are qualified based on the template chooser process.

* * * * *